United States Patent [19]

Johnson

[11] Patent Number: 4,619,590

[45] Date of Patent: Oct. 28, 1986

[54] AIR DIVERTER FOR SUPERCHARGER

[76] Inventor: Kenneth A. Johnson, 15236 Tacoma St., Detroit, Mich. 48205

[21] Appl. No.: 725,956

[22] Filed: Apr. 22, 1985

[51] Int. Cl.⁴ .................... F04B 17/00; F04B 35/00
[52] U.S. Cl. .................................... 417/407; 417/408
[58] Field of Search ............. 417/407, 408, 409; 60/39.07, 612; 98/1.5

[56] References Cited

U.S. PATENT DOCUMENTS

| | | | |
|---|---|---|---|
| 2,585,570 | 2/1952 | Messinger et al. | 98/1.5 |
| 2,734,356 | 2/1956 | Kleinhans | 98/1.5 |
| 2,839,005 | 6/1958 | Means | 417/407 |
| 3,523,428 | 8/1970 | Nagyszalanczy | 417/407 |
| 4,344,289 | 8/1982 | Curiel et al. | 417/407 |

FOREIGN PATENT DOCUMENTS

| | | | |
|---|---|---|---|
| 190518 | 11/1983 | Japan | 60/612 |
| 851317 | 10/1960 | United Kingdom | 60/612 |

Primary Examiner—Louis J. Casaregola
Assistant Examiner—Timothy S. Thorpe
Attorney, Agent, or Firm—Peter A. Taucher; John E. McRae; Robert P. Gibson

[57] ABSTRACT

An engine supercharger is modified to include an auxiliary turbine downstream from the main turbine wheel. The main shaft of the supercharger is tubular (hollow) to accommodate a second shaft. The opposite ends of the second shaft are suitably connected to the auxiliary turbine and an auxiliary fan that is located upstream from the main compressor wheel within the supercharger. An air-collection chamber of scroll-like configuration is arranged between the auxiliary fan and compressor wheel to receive air discharged from outer tip areas of the fan blades.

3 Claims, 4 Drawing Figures

AIR DIVERTER FOR SUPERCHARGER

GOVERNMENT INTEREST

The invention described herein may be manufactured, used, and licensed by or for the Government for governmental purposes without payment to me of any royalty.

BACKGROUND AND SUMMARY OF THE INVENTION

My copending patent application, Ser. No. 725,972, filed on Apr. 22, 1985, discloses an air system for cooling a piston engine. The disclosed system includes a fan mechanism driven by a supercharger turbine to provide a source of coolant air for the engine. The present invention relates to a variation or improvement on the system described in the copending patent application.

In the present invention, the fan mechanism is driven by an auxiliary turbine located downstream from the main turbine wheel in the supercharger. Part of the airstream generated by the fan is diverted from the mainstream into an annular collector chamber that surrounds the main passageway leading to the compressor wheel in the supercharger.

The present invention differs from the invention disclosed in my copending patent application in that the fan mechanism is driven by an auxiliary turbine. Also, in the present invention I contemplate that the collected air can be used for engine cooling or for purposes other than engine cooling, e.g., cooling compressed air going to the engine, and/or cooling the engine lubricating oil, and/or providing a source of ventilation air for the crew compartment.

By using an auxiliary turbine to drive the fan, it should be possible to maintain optimum performance of the main turbine and compressor over a wide operating range (because the main turbine is required to drive only the engine charge air compressor). The addition of the second auxiliary turbine results in turbine energy available for the second stage compressor which more closely matches the engine's needs. The new system is a true two stage system with better overall range and pressure ratio capability than the single stage it replaces. The second stage turbine makes use of energy normally wasted in a conventional system. The auxiliary fan represents a relatively light load that can be adequately handled by the auxiliary turbine.

THE DRAWINGS

Figure 1:
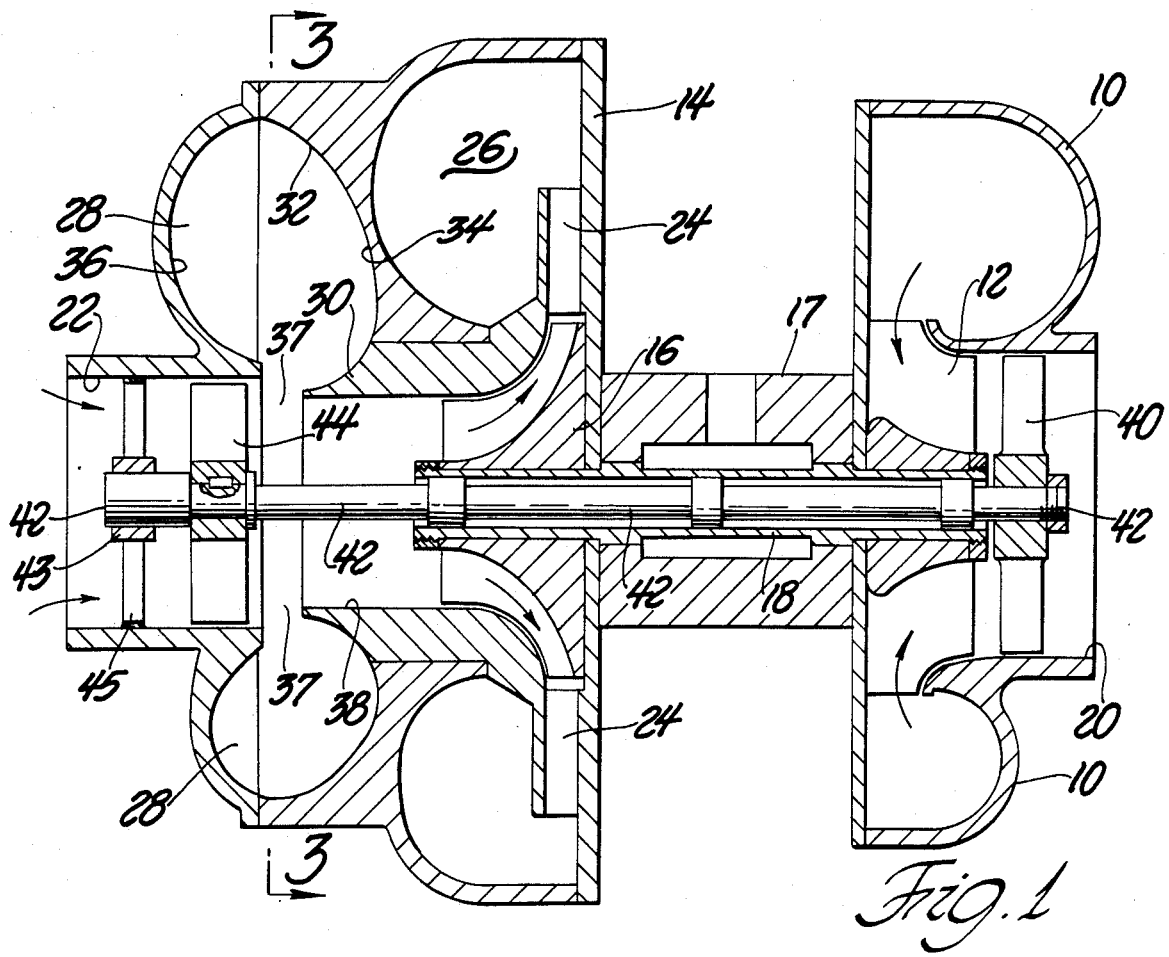
FIG. 1 is a sectional view taken through an engine supercharger embodying my invention.
Figure 2:
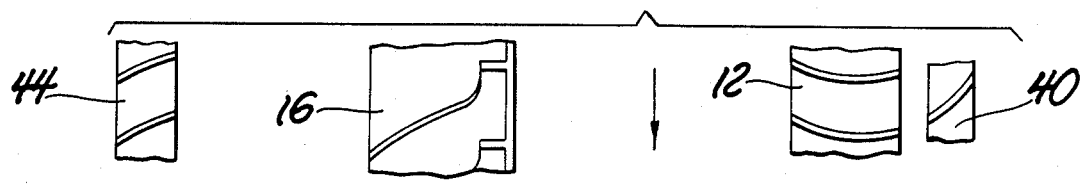
FIG. 2 is a fragmentary view illustrating certain blade configurations used in the FIG. 1 supercharger.

The supercharger of FIG. 1 comprises a turbine housing 10, turbine wheel 12, compressor housing 14, and compressor wheel 16. A hollow (annular) shaft 18 is suitably connected to wheels 12 and 16 such that both wheels rotate as a unit. The shaft is supported by suitable bearings in central housing 17.

Motive force for driving wheels 12 and 16 is provided by the flow of hot pressurized gas from the non-illustrated engine through housing 10. The pressurized gas is discharged from the supercharger through an exit opening 20.

Raw air for engine combustion is taken into compressor housing 14 through an intake opening 22. The blades on compressor wheel 16 centrifugally sling the air outwardly through stationary diffuser vanes 24 into compressor outlet chamber 26. A non-illustrated passage structure transmits the pressurized air from chamber 26 to the engine.

The supercharger, as thus far described, may be considered conventional. My invention relates to a mechanism for diverting some of the air away from the compressor wheel 16 for use as an engine coolant and/or other use in the vehicle in which the supercharged engine is employed.

The air diverting mechanism comprises an auxiliary second stage turbine wheel 40 suitably affixed to a shaft 42 in a location downstream from turbine wheel 12. Shaft 42 extends in a right-to-left direction through hollow shaft 18 to a suitable connection with a fan 44. Presurized engine exhaust gas passes through the blades of turbine wheel 40, causing wheel 40 and fan 44 to rotate as a unit. Fan 44 moves air from air intake opening 22 toward compressor wheel 16. The left end of shaft 42 has bearing support in a bearing 43 carried on a stationary spider 45.

Suitable bearings are provided at spaced points along shaft 42, such that shaft 42 is free to have rotary sliding motion on the inner surface of hollow shaft 18. There are two independently rotating units. One unit is comprised of turbine wheel 12, hollow shaft 18, and compressor wheel 16. The other unit is comprised of auxiliary turbine wheel 40, shaft 42 and fan 44. Fan 44 forms part of a mechanism for diverting air from (or around) compressor wheel 16.

Figures 3, 4:
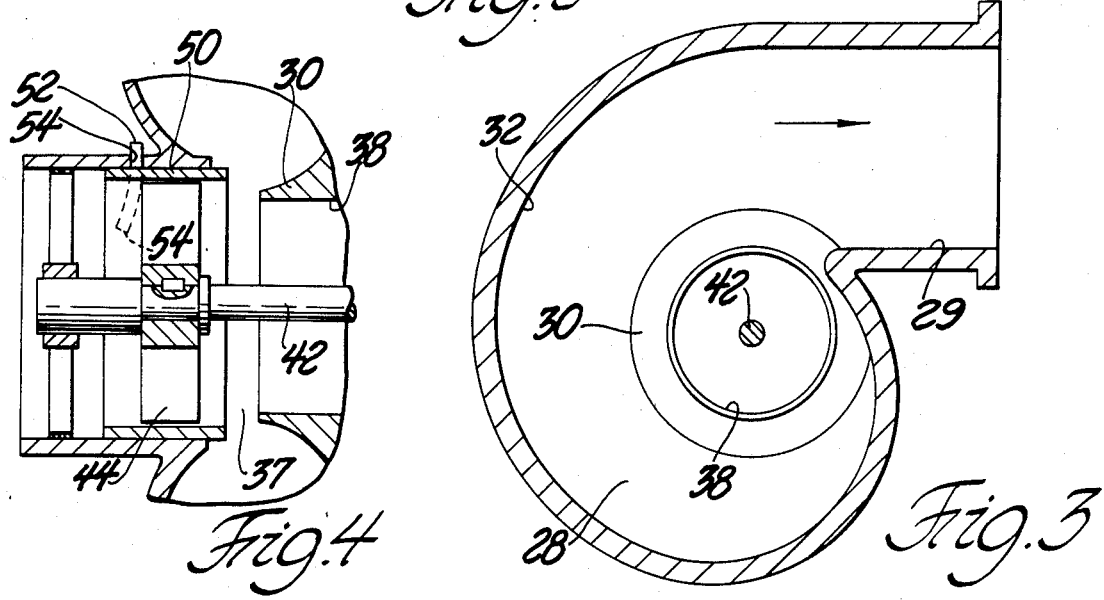
FIG. 3 is a sectional view on line 3—3 in FIG. 1.
FIG. 4 is a fragmentary sectional view illustrating a variation of the FIG. 1 structure.

The air-diverting mechanism comprises an annular collector chamber 28 surrounding the main passageway 38 leading to compressor wheel 16. Chamber 28 is defined by an inner wall 30, outer wall (or surface) 32, and end wall surfaces 34 and 36; the various wall surfaces may be curved or merged as shown in FIG. 1. The upstream end of wall 30 is spaced from the inner termination of end wall 36 to define an annular mouth or entrance 37 for air flow from main passageway 38 into collector chamber 28. Chamber 28 is a toroidal annular scroll-like chamber that terminates in a tangential outlet passage 29 (FIG. 3).

Annular wall 30 is concentric to the shaft 18 rotational axis. Wall surface 32 has a variable spacing relative to the shaft 18 rotational axis, such that chamber 28 has a scroll configuration in planes taken normal to the shaft 18 axis; FIG. 3 illustrates the scroll configuration. Air is discharged from chamber 28 through tangential passage 29.

Wall 30 is closer to the shaft 42 axis than the tips of the blades on fans 44, i.e., wall 30 is located within the fan blade axial profile (looking along the shaft 42 axis). During fan rotation, the air has axial motion components and centrifugal motion components. Wall 30 intercepts the outer ring of moving air and directs said outer air ring through mouth 37 into collector chamber 28. The remainder of the air flows through passageway 38 toward compressor wheel 16.

The air collected in chamber 28 can be used for various purposes, e.g., engine cooling, and/or lubrication oil cooling, and/or cooling the combustion air after its compression by compressor wheel 16.

My invention is intended for use primarily in armored vehicles. Such vehicles are usually designed to have a minimum number of air openings in the hull-turret envelope to maintain, as far as possible, a continuous uninterrupted armor surface capable of defeating enemy munitions (projectiles, mines, explosive particles, etc.). The structure shown in FIG. 1 is advantageous in such armored vehicles in that only two openings need be provided in the hull envelope to operatively position the supercharger (or superchargers in some cases). Fan 44 and collector chamber 28 are incorporated into the supercharger, thereby obviating the need for extra openings in the hull envelope to admit the extra air quantities represented by fan 44.

The quantity of air admitted to collector chamber 28 is affected to a certain extent by the radial spacing of wall 30 from the shaft rotational axis; the closer wall 30 is to the shaft rotational axis, the more air will be diverted into chamber 28. The quantity of diverted air is also affected by the width of entrance mouth 37. FIG. 4 illustrates a mechanism for varying the width of mouth 37, either to calibrate the mouth area or to provide a variable control action on collector chamber 28 performance. The FIG. 4 mechanism comprises a sleeve 50 having a pin 52 extending outwardly through a helical slot 54 in the housing wall 56. Arcuate movement of pin 52 around wall 56 (by a non-illustrated controller) causes sleeve 50 to advance toward or away from the upstream edge of wall 30, thereby varying the width of entrance mouth 37.

The chief advantage of the illustrated mechanism over the mechanism shown in my copending patent application, Ser. No. 725,972, is the use of auxiliary turbine wheel 40 to drive fan 44. The primary turbine wheel 12 typically has excess power available, particularly under high flow conditions; the gas exiting from the blades of turbine wheel 12 has a significant motion component in the circumferential direction. The blades of axial second stage turbine 40 utilize this circumferential motion component to drive fan 44 at sufficient speed to contribute a booster effect on compressor wheel 16 performance. It is believed that the combination of turbine wheels 12 and 40 will be able to more efficiently extract energy from the engine exhaust gas then turbine wheel 12 alone. The greater energy extraction efficiency makes more power available to fan 44 and compressor wheel 16.

Axial fan 44 and centrifugal wheel 16 form a two stage compressor. Fan 44 compresses the raw air to a low pressure, e.g., 5 p.s.i.g. Wheel 16 compresses the air to a higher pressure. Fan 44 effectively increases the quantity of air taken through intake opening 22; at least part of the increased flow is diverted into chamber 28. Neither fan 44 nor collector chamber 28 will detract from the performance of compressor wheel 16. Wheel 16 will be able to achieve the desired air compression function when appropriately matched to the engine.

The unit comprised of turbine wheel 12 and compressor wheel 16 operates essentially in the conventional manner. The unit comprised of turbine wheel 40 and fan 44 operates as a booster to increase the quantity of air taken through intake opening 22, as necessary for supplying air to chambers 28 and 26.

The air diverted into chamber 28 can be used for any of several purposes. When used for cooling the engine, the air flow will automatically increase roughly in accordance with the need for engine cooling. Under high-load speed conditions, auxiliary turbine wheel 40 will have a relatively high rotational speed. Fan 44 speed will be increased to deliver increased air quantities into chamber 28.

I wish it to be understood that I do not desire to be limited to the exact details of construction shown and described for obvious modifications will occur to a person skilled in the art, without departing from the spirit and scope of the appended claims.

I claim:

1. An engine supercharger comprising a turbine housing, a main turbine wheel of the radial-inflow type located within said turbine housing, a compressor housing having an air entrance passageway (38), a compressor wheel of the centrifugal type located within said compressor housing, a main shaft (18) of annular construction interconnecting said turbine wheel and said compressor wheel whereby the two wheels rotate as a unit, an auxiliary turbine wheel of the axial flow type located downstream from the main turbine wheel, a fan of the axial flow type located upstream from the compressor wheel, an auxiliary shaft (42) extending within the main shaft between the auxiliary turbine and fan whereby the auxiliary turbine and fan rotate as a unit, and an annular air collector chamber means (28) located immediately downstream from the fan in surrounding relation to the aforementioned entrance passageway for diverting some of the fan air from the compressor wheel, said fan comprising a hub and blades radiating outwardly therefrom, said air collector chamber being defined in part by an annular wall (30) having a free edge located within the fan blade axial profile whereby said annular wall intercepts air discharged from outer tip areas of the fan blades to divert same away from the compressor wheel into the collector chamber.

2. The supercharger of claim 1 wherein said annular wall (30) is a generally cylindrical wall concentric to said auxiliary shaft; said collector chamber means (28) including an end wall (36) terminating in spaced relation to the annular wall to define an annular entrance mouth (37) for the collector chamber.

3. The supercharger of claim 2 and further comprising a sleeve (50) mounted for axial adjusting movements across the annular entrance mouth to vary the effective mouth width.

* * * * *